(12) United States Patent
Mooney

(10) Patent No.: US 9,753,706 B2
(45) Date of Patent: *Sep. 5, 2017

(54) ADDING DIRECTIVES FOR VERSIONS OF SOURCE FILES DIRECTLY INTO SOURCE CODE

(71) Applicant: James Mooney, San Francisco, CA (US)

(72) Inventor: James Mooney, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/838,593

(22) Filed: Aug. 28, 2015

(65) Prior Publication Data

US 2016/0041822 A1 Feb. 11, 2016

Related U.S. Application Data

(63) Continuation of application No. 12/985,298, filed on Jan. 5, 2011, now Pat. No. 9,262,137.

(60) Provisional application No. 61/349,132, filed on May 27, 2010.

(51) Int. Cl.
*G06F 9/44* (2006.01)
*G06F 9/45* (2006.01)
*G06F 9/455* (2006.01)

(52) U.S. Cl.
CPC ............. *G06F 8/423* (2013.01); *G06F 8/71* (2013.01); *G06F 9/45516* (2013.01); *G06F 8/68* (2013.01)

(58) Field of Classification Search
CPC .......................................................... G06F 8/51
USPC ............................................................ 717/136
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |

(Continued)

OTHER PUBLICATIONS

USPTO, non-final Office Action for U.S. Appl. No. 12/985,298, dated May 15, 2014.

(Continued)

*Primary Examiner* — Matthew Brophy
(74) *Attorney, Agent, or Firm* — Lorenz & Kopf, LLP

(57) ABSTRACT

A version of the source file is created that includes source code from a source file, and at least a portion of a client-side scripting language file (CSSLF) for generating at least a portion of markup language for a web page to be served to a client device using a webserver. A processor associates metadata with a preprocessed directive (PPD) and a version of the source file (VSF). The metadata can include at least the portion of the CSSLF. The webserver can then retrieve, from a database, only the metadata associated with the PPD in the VSF such that the entire source file does not need to be retrieved. When a request for the metadata associated with the VSF is received, at least the portion of the markup language for the web page can be generated in accordance with the metadata associated with the PPD and the VSF.

20 Claims, 6 Drawing Sheets

(56) References Cited

U.S. PATENT DOCUMENTS

| | | | |
|---|---|---|---|
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,061,518 A * | 5/2000 | Hoffman | G06F 11/362 |
| | | | 714/38.1 |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,189,137 B1 * | 2/2001 | Hoffman | G06F 8/4436 |
| | | | 717/115 |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,845,500 B2 | 1/2005 | Ponticelli et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,069,231 B1 | 6/2006 | Cinarkaya et al. | |
| 7,181,758 B1 | 2/2007 | Chan | |
| 7,197,744 B2 * | 3/2007 | Hostettler | G06F 8/33 |
| | | | 717/125 |
| 7,289,976 B2 | 10/2007 | Kihneman et al. | |
| 7,316,003 B1 * | 1/2008 | Dulepet | G06F 17/218 |
| | | | 717/110 |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,493,594 B2 * | 2/2009 | Shenfield | G06F 8/10 |
| | | | 717/102 |
| 7,508,789 B2 | 3/2009 | Chan | |
| 7,620,655 B2 | 11/2009 | Larsson et al. | |
| 7,627,658 B2 * | 12/2009 | Levett | G06F 9/46 |
| | | | 709/203 |
| 7,698,160 B2 | 4/2010 | Beaven et al. | |
| 7,779,475 B2 | 8/2010 | Jakobson et al. | |
| 7,823,164 B2 * | 10/2010 | Gibbs | G06F 8/30 |
| | | | 709/201 |
| 7,840,956 B2 * | 11/2010 | Gough | G06F 9/4446 |
| | | | 717/169 |
| 7,861,222 B2 * | 12/2010 | Ramsey | G06F 8/314 |
| | | | 717/114 |
| 7,971,194 B1 * | 6/2011 | Gilboa | G06F 8/10 |
| | | | 717/106 |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,150,939 B1 * | 4/2012 | Murray | G06F 17/30896 |
| | | | 709/203 |
| 8,209,308 B2 | 6/2012 | Rueben et al. | |
| 8,275,836 B2 | 9/2012 | Beaven et al. | |
| 8,356,277 B1 * | 1/2013 | Bank | G06F 9/45529 |
| | | | 717/111 |
| 8,443,345 B2 * | 5/2013 | Carteri | G06F 8/44 |
| | | | 717/137 |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,504,985 B2 * | 8/2013 | Kalaidjian | G06F 9/44 |
| | | | 715/808 |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,645,916 B2 * | 2/2014 | Hanus | G06F 8/35 |
| | | | 717/115 |
| 8,646,103 B2 | 2/2014 | Jakobson et al. | |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0018954 A1 * | 1/2003 | Ponticelli | G06F 8/30 |
| | | | 717/106 |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |

(56) References Cited

U.S. PATENT DOCUMENTS

| | | |
|---|---|---|
| 2004/0199536 A1 | 10/2004 | Barnes Leon et al. |
| 2004/0199543 A1 | 10/2004 | Braud et al. |
| 2004/0216042 A1* | 10/2004 | Consolatti ............... G06F 8/30 715/234 |
| 2004/0237069 A1* | 11/2004 | Colgrave ............... G06F 8/30 717/115 |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0131811 A1* | 6/2005 | Ranzini ............... G06Q 10/107 705/39 |
| 2006/0005207 A1* | 1/2006 | Louch ............... G06F 8/38 719/328 |
| 2006/0021019 A1 | 1/2006 | Hinton et al. |
| 2006/0117257 A1* | 6/2006 | Hasson ............... G06F 9/4448 715/262 |
| 2007/0186211 A1* | 8/2007 | Crasovan ............... G06F 8/70 717/140 |
| 2008/0022267 A1* | 1/2008 | Johnson ............... G06F 8/38 717/143 |
| 2008/0098349 A1* | 4/2008 | Lin ............... G06F 8/10 717/106 |
| 2008/0163168 A1* | 7/2008 | Huang ............... G06F 8/423 717/118 |
| 2008/0201701 A1* | 8/2008 | Hofhansl ............... G06F 8/60 717/168 |
| 2008/0249972 A1 | 10/2008 | Dillon |
| 2008/0301702 A1* | 12/2008 | Gibbs ............... G06F 8/30 719/311 |
| 2009/0063414 A1 | 3/2009 | White et al. |
| 2009/0100342 A1 | 4/2009 | Jakobson |
| 2009/0177744 A1 | 7/2009 | Marlow et al. |
| 2010/0131951 A1* | 5/2010 | Carteri ............... G06F 9/45529 718/100 |
| 2010/0180194 A1* | 7/2010 | Ji ............... G06F 8/38 715/234 |
| 2011/0016020 A1* | 1/2011 | Emigh ............... G06Q 30/02 705/26.7 |
| 2011/0055683 A1* | 3/2011 | Jiang ............... G06F 17/30899 715/234 |
| 2011/0247051 A1 | 10/2011 | Bulumulla et al. |
| 2011/0296375 A1* | 12/2011 | Mooney ............... G06F 8/423 717/106 |
| 2011/0296381 A1* | 12/2011 | Mooney ............... G06F 8/423 717/122 |
| 2012/0042218 A1 | 2/2012 | Cinarkaya et al. |
| 2012/0218958 A1 | 8/2012 | Warshavsky et al. |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0026115 A1* | 1/2014 | Bank ............... G06F 8/38 717/113 |

OTHER PUBLICATIONS

Response to non-final Office Action for U.S. Appl. No. 12/985,298, dated Sep. 4, 2014.
USPTO, non-final Office Action for U.S. Appl. No. 12/985,298, dated Jan. 2, 2015.
Response to non-final Office Action for U.S. Appl. No. 12/985,298, dated Feb. 26, 2015.
USPTO, Notice of Allowance for U.S. Appl. No. 12/985,298, dated Jun. 22, 2015.

* cited by examiner

ADDING DIRECTIVES FOR VERSIONS OF SOURCE FILES DIRECTLY INTO SOURCE CODE

CLAIM OF PRIORITY

This application is a continuation of U.S. patent application Ser. No. 12/985,298, entitled "ADDING DIRECTIVES FOR VERSIONS OF JAVASCRIPT FILES DIRECTLY INTO SOURCE CODE IN A MULTI-TENANT DATABASE ENVIRONMENT," by Mooney, filed Jan. 5, 2011, which claims the benefit of U.S. Provisional Patent Application 61/349,132 entitled "METHODS AND SYSTEMS FOR ADDING DIRECTIVES FOR JAVASCRIPT FILES DIRECTLY INTO SOURCE CODE IN A MULTI-TENANT DATABASE ENVIRONMENT," by Mooney, filed May 27, 2010, the entire contents of which are incorporated herein by reference.

CROSS REFERENCE TO RELATED APPLICATIONS

The following commonly owned, co-pending United States Patents and Patent Applications, including the present application, are related to each other. Each of the other patents/applications are incorporated by reference herein in its entirety: U.S. patent application Ser. No. 12/985,303, entitled "ADDING DIRECTIVES FOR JAVASCRIPT FILES DIRECTLY INTO SOURCE CODE IN A MULTI-TENANT DATABASE ENVIRONMENT," by Mooney, filed Jan. 5, 2011.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to adding directives for JavaScript files directly into source code.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request on a webpage. The rapid and efficient retrieval of accurate information and subsequent delivery of this information to the user system has been and continues to be a goal of administrators of database systems.

Oracle Corporation JavaScript™ (hereinafter JavaScript) is a programming language and/or scripting language that may be used with a web browser at the client-side (e.g. user system) to provide enhanced user interfaces and dynamic websites. Approaches to delivering JavaScript to the client-side include sending all of JavaScript for the website to client for every page delivered which may unnecessarily slow the delivery of information because all of the JavaScript may not be used on the webpage. Unfortunately, conventional database approaches might become inefficient if, for example, all of the JavaScript for a website is sent to the client for each webpage when a fraction of the JavaScript is utilized on the webpage.

Accordingly, it is desirable to provide techniques enabling a way to deliver JavaScript more efficiently to the user of the database system, and/or to improve efficiency of the database system.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

General Overview

Figure 1:
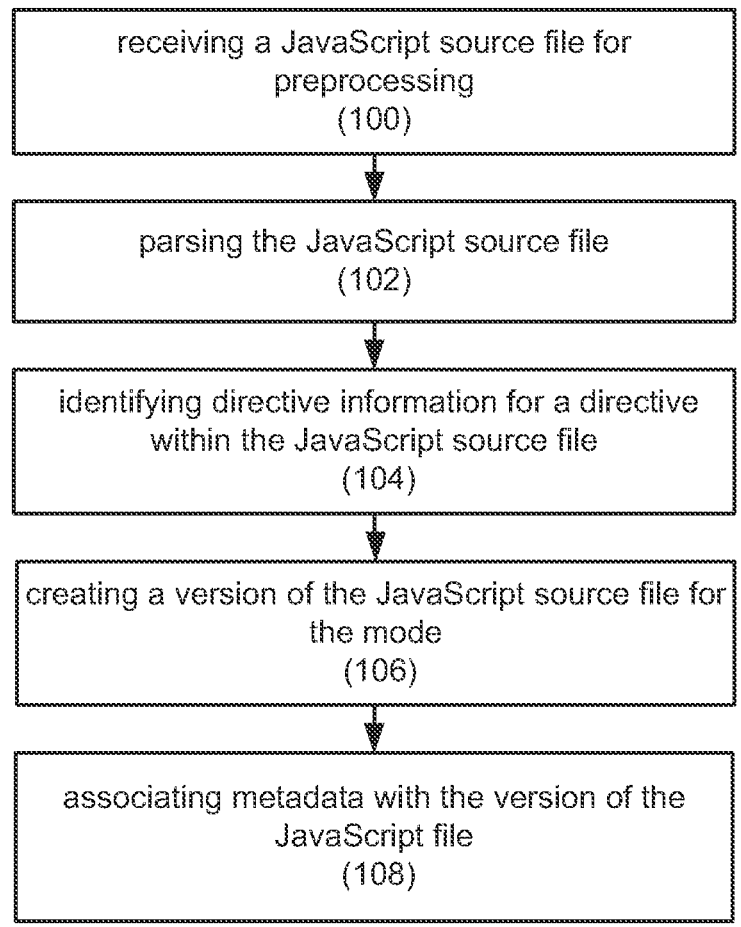
FIG. 1 illustrates an example of a simplified flow diagram for an implementation of adding directives for versions of JavaScript files directly into source code.

Systems, computer readable mediums, and methods are provided for adding directives for JavaScript files directly into source code.

In accordance with one embodiment, a processor receives a source file for preprocessing that includes source code and that is written in the client-side scripting language, and parses the source file and identifies directive information for a preprocessed directive within the source code of the source file. The directive information can include data on at least the portion of a client-side scripting language file (and optionally a mode such as debug mode, development mode, production mode, test mode, or performance test mode). The directive can be, for example, an include directive, and/or an if directive. The data on at least a portion of the client-side scripting language file can include, for example, a file path for a directory.

The processor can then create a version of the source file (e.g., for the mode) that includes source code from the source file, and at least the portion of the client-side scripting language file for generating at least a portion of markup language for a web page that is to be served to a client device using a webserver. The version of the source file can include, for example, JavaScript for one or more groups.

A processor associates metadata with a preprocessed directive and a version of the source file. The metadata can include at least the portion of the client-side scripting language file, and optionally other information such as information regarding which portions of the source file have been altered since a last preprocessing of the source file has occurred. For example, in one implementation, the metadata for the version of the source file can include, for example, a URL for a group from one or more groups.

The webserver can retrieve, from a database, only the metadata associated with the preprocessed directive in the version of the source file (e.g., from the source code from the source file that is also included in the version of the source file) such that the entire source file does not need to be retrieved.

This way, when a request for the metadata associated the version of the source file is received, at least the portion of the markup language for the web page (to be served to the client device) can be generated in accordance with the metadata associated with the preprocessed directive and the version of the source file In one or more embodiments, a configurable directive may be placed directly in source code to provide direction for the generation of one or more versions of the source code. Source code is a collection of declarations and/or statements written in a computer programming language, such as JavaScript. The configurable directive may be configured to indicate a mode, a portion of a markup language to place in a webpage, associate metadata with the directive and/or source code file, and/or a portion of the JavaScript to place in the JavaScript file for the mode. The original JavaScript source code file may be preprocessed to generate one or more versions of JavaScript with or without the portion of the JavaScript as designated in the directive. Preprocessing is processing data that may be input to another program and/or process. Preprocessing of a JavaScript source code file with directives in one or more embodiments may enable the generation of a version of a JavaScript file for each mode in the original source code file.

The mode may indicate a type or a version of the original JavaScript source code file that contains the JavaScript specified in the configurable directive. It may be desirable to break up and group the JavaScript in accordance with the expected usage of the JavaScript in a particular version to efficiently deliver the appropriate JavaScript for a webpage. In one or more embodiments, the modes may be used to group JavaScript files that are expected to be used by a particular user and/or a particular purpose. For example, a version of a JavaScript for debugging may have debugging code in the JavaScript whereas the version of JavaScript for production may be compressed and not as easily readable for debugging purposes.

In another example, the JavaScript may be grouped in accordance with the usage on particular webpages. For example, JavaScript that is used on a majority of webpages for a website may be grouped together in one JavaScript file and included with a majority of the webpages. JavaScript used for fewer pages may be grouped in accordance with the expected usage on a webpage and included on relatively fewer webpages.

The JavaScript files may be embedded or included in HyperText Markup Language (HTML) files. HTML is a set of markup tags and the tags are used to describe web pages. JavaScript is a client-side scripting language and may be used to enable access to data and/or objects within a host and/or client-side environment. JavaScript may be downloaded to the client device or user system from the server and executed locally at the client. JavaScript may be viewed as a prototype-based object-oriented scripting language that may not use classes and behavior reuse may be accomplished with cloning of objects. The JavaScript may be compiled and/or interpreted with a web browser at the client and executed locally at the client. A web browser is a software application for retrieving, presenting, and traversing information resources available on the World Wide Web and/or over a network. Those with skill in the art will recognize that there are various compilers and/or browsers that may be used to implement adding directives for JavaScript files directly into source code. Although implementations are provided throughout that add directives to JavaScript files, those with skill in the art will recognize that implementations may add directives to source code for a variety of client-side scripting languages. For example, directives may be added to Adobe Actionscript™ source code files.

Embodiments may use directives in the source code to associate metadata to a particular JavaScript file(s) and/or the configurable directive in the JavaScript. The metadata may be identified or generated during preprocessing of the directive. The metadata may be stored for later retrieval and/or kept in memory after preprocessing of the JavaScript file(s) for later retrieval. The associated metadata for a preprocessed directive may be retrieved when the source code is compiled and executed at a client device using the web browser. The web server is a software application that helps to deliver content that can be accessed through the internet or over a network with the web browser. In one or more embodiments, a script is run by the web server to ensure that the metadata associated with a preprocessed directive is in memory and available for retrieval.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, systems and methods for adding directives for JavaScript files directly into source code will be described with reference to example embodiments. FIG. 1 illustrates an example of a simplified flow diagram for an implementation of adding directives for versions of JavaScript files directly into source code. A JavaScript source file for preprocessing may be received (100). A script may be created to indicate the JavaScript files that may need preprocessing and execute a process for the preprocessing of the files. In one or more embodiments, a script may designate a root directory for the source files, a file to start parsing from, the directives recognized by a group, and/or the modes used for preprocessing. For example, a Java™ class file may be created with a method to run the preprocessing for one or more JavaScript files in a particular directory. In another example, the preprocessing and generation of versions of source code for the JavaScript may be performed during a build process with a build tool, such as during Apache Ant™ task. A build process may entail compiling software into executable code and running a script to preprocess the JavaScript files.

The preprocessor may be a software program that processes its input data to produce output that is used as input to another program or process. The use of a JavaScript preprocessor may enable a user to put directives with metadata for JavaScript files directly into the source code for preprocessing. The directives may indicate a version of a JavaScript source code file to generate and the JavaScript to include in the resulting preprocessed JavaScript version of the JavaScript source code file. The resulting preprocessed JavaScript files may be used on one or more webpages served to a client device.

The JavaScript source file may be parsed (102). The preprocessor may parse the JavaScript source code file to identify one or more directives and any information for the directive. Parsing may entail the process of analyzing text to identify tokens (e.g. words and expressions) and identifying grammatical structures in the JavaScript in accordance with a provided grammar. Those with skill in the art will recognize that a variety of parsing tools may be used to perform lexical analysis, syntactic analysis, and/or semantic analysis to parse the JavaScript source code file.

Directive information for a directive may be identified within the JavaScript source file (104). The directive may be configured by the user and directive information for the directive may be provided with the directive in the JavaScript source code file. The directive information may be any textual data, numerical data, or any combination thereof that can be provided with the directive and parsed. For example, the directive may have directive information associated with the directive, such as data on at least a portion of a JavaScript file and a mode. The data on at least a portion of a JavaScript file may be a file path, a directory path, a relative file path, or any other data that designates a location for a portion and/or one or more files. The portion of the JavaScript file may constitute an entire file for JavaScript, one or more files, and/or it may have what constitutes a portion of JavaScript file (e.g. half of a function in JavaScript).

The directive may indicate that the portion of JavaScript file included with the directive be placed in the version of the JavaScript file where the directive is found in the original JavaScript source code file. In another embodiment, the directive may indicate a relative position in the JavaScript source code file for placement of at least the portion of the JavaScript file. For example, the directive may indicate the ordering of placement of JavaScript files found in a directory to be placed in the version of the JavaScript file. Continuing with the example, a directory may have files A.js, B.js, and C.js, and the directive may indicate the ordering of the placement of JavaScript files found in the directory, such as placement of the files in the order: C.js, A.js, B.js.

In an embodiment, the directive information may be provided as one or more sets of name/value pairs. For example, the JavaScript Object Notation (JSON) may be used to indicate name/value pairs and simple arrays in the directive information. Continuing with the example, for the following directive information:

"{Mode: {"DEV", "DEBUG"}, Path: {"B.js", "A.js"}"
the directive information has the name value pairs of Mode=DEV and Mode=DEBUG, and Path=B.js and Path=A.js. The directive information in the example may be placed in any data structure. For example, an array may be created with the Mode array containing DEV and DEBUG.

The directive may begin with one or more characters or symbols to designate the line as a directive in the source file. For example, directives may begin with //# and can be either single line or multiline. In a preferred embodiment, the directive may begin with a comment symbol (e.g. //) that is not recognized by the JavaScript compiler or interpreter and a pound sign (e.g. #) to recognize the commented text as a directive. The JavaScript may then be compiled or interpreted without preprocessing if necessary because the directive information is commented out and/or the directive information may remain in the preprocessed file for debugging purposes.

An "include" directive may include another source file at the directive location. The include directive may allow a user to separate source code into as many files as desired and serve it all as one file in the exact order desired. The "include" directive enables a user to put the entire contents of one file inside another file, not just before or after the file. It may be desirable to use the "include" directive to put the entire contents of one file inside another file at the position where the include directive is placed in the source file and provide more functionality than simply indicating a dependency between files. For example, the "include" directive below may be in a JavaScript file and indicates that a mode "DEV" will include a file in the JavaScript file for mode "DEV" with a file path "B.js":

//#include {modes: ["DEV"], path: "B.js"}.

The directive information of the mode "DEV" and path "B.js" is provided with the directive in the example.

An "if" directive is a conditional directive and enables a user to output an entire block of source code when a condition is met. The "if" directive may enable a user to output a block of code in the modes desired and omit the code when other modes are designated. For example, an "if" directive below may include the "function testFoo( ){ }" in the JavaScript file version for a mode "TEST" with the following:

```
//# if {modes: ["TEST"]{
    function testFoo( ){ }"
//#endif.
```

A mode provides the ability to designate source files or portions of files for a context to be written in the same file. A user may define directives and modes for any purpose. The directives and directive information may be parsed and extracted from the original source and the directives may be used to generate multiple copies of the source (e.g. one for each mode).

A version of the JavaScript source file for the mode may be created (106). The version of the JavaScript source code file may have JavaScript from the original JavaScript source file and at least a portion of the JavaScript file that may be identified in the directive information (e.g. data provided with the directive). The mode may be used with a directive in order to change the output based on the context.

Context may include, but is not limited to, debug, development, production, test, performance test, or any other circumstances and/or expected usage for which the JavaScript may be written. A mode may specify whether the output should be compressed. For example, compression may involve removing all white space and comments from the JavaScript file.

Modes may indicate a state in implementation for the code, such as development, production, beta testing, and testing modes. For example, a development mode may be used for adding debugging code, a production mode may be optimized and compressed for use by an end user, and a testing mode may be used when running automated tests, generally exposing private data for the test case to verify. One or more JavaScript files may be created from the original JavaScript source code file.

In an embodiment, the resulting JavaScript file may concatenate the mode and the original JavaScript filename together to form the filename for the version of the JavaScript source code file. For example, the filename for a source code file "B.js" with mode "DEV" may be "B_DEV.js."

In another embodiment, the mode may be for a particular tenant of a multi-tenant database. The mode may be used to specify JavaScript to be added to a JavaScript file for a particular tenant. When a user and/or a client is identified as associated with a particular tenant (e.g. with a tenant primary key), then a particular portion of a JavaScript file and/or entire JavaScript file may be served to the client.

Metadata may be associated with the version of the JavaScript file (108). Metadata may be included with the directive information and/or generated during preprocessing of the JavaScript source code file. Metadata may include, but is not limited to, the following: directive information, timestamp for creation of file or portion of a file, data path and filename for JavaScript file or portion of JavaScript file, label information, security information, personalization, one or more Servlets associated with JavaScript, or any other metadata used for serving a webpage at a client device. For example, the metadata may include information on what portions of JavaScript have been altered since the last preprocessing occurred. A Servlet is a Java language class that can respond to Hypertext Transfer Protocol (HTTP) requests. The Servlet may enable adding dynamic content to a webpage.

A "label" directive may indicate a portion of a webpage that may need to be altered or dynamic. For example, the "label" directive may be used to support localization. Localization is the adaption of a portion of the webpage for a user in a non-native environment, especially other nations or cultures. An example of a label directive is as follows:

//# label {section: "buttons", param: "go"}.

With the label directive, in the example, a button on a webpage with the text description of "go" may be altered in accordance with the language of other nations and/or accepted text for a particular culture. The directive information of the section and param may be stored as metadata for the label directive. Metadata associated with the label directive may provide the additional localization information to enable changing the text description of the button (e.g. param) on a webpage served to the client. In the example, the param directive information may serve as a parameter for an object or element on the HTML webpage and the HTML may be generated on-the fly.

Labels directives may be used for a variety of purposes including, but not limited to, formatting of dates, formatting of numbers, formatting names, and/or any other customization for a webpage. The associated metadata may be stored during preprocessing and available for later retrieval. The associated metadata may be stored in properties files for later instantiation of classes that utilize the information. For example, the metadata may be placed into a Java .properties file and may be used by an instantiation of a class that provides access to the properties in the file. The metadata may be stored with methods including, but not limited to, the following: an XML file, a database, a static mapping, or any other implementation that enables storage of data.

Although various directives are shown as examples throughout, those with skill in the art will recognize that are a variety of directives that may be created and configured to provide a plurality of versions of JavaScript, a plurality of versions of webpages, and/or portions of a webpages. Although various implementations are provided throughout that utilize the Java programming language, HTML, Java Servlets, Java Servlet Pages (JSP), and XML, those with skill in the art will recognize that various programming languages may be used to implement a JavaScript preprocessor.

Figure 2:
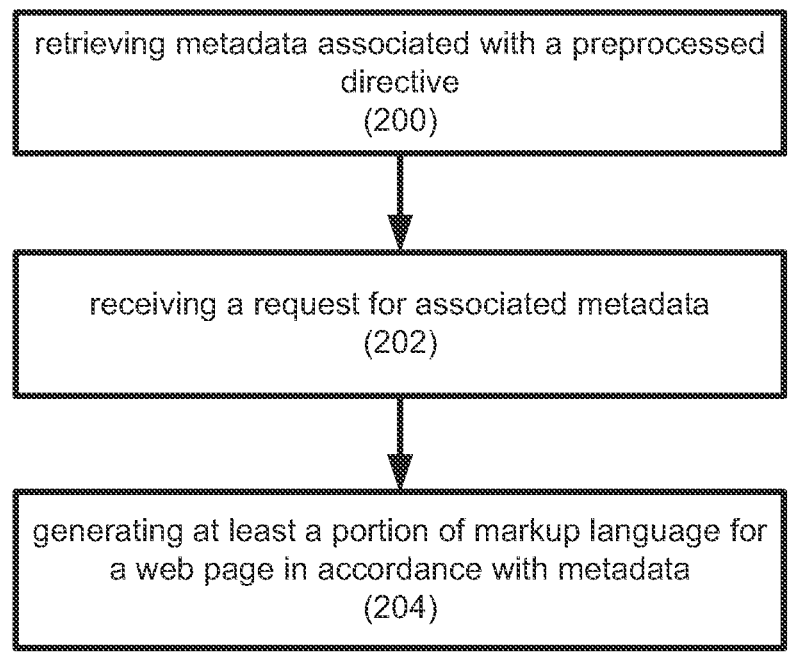
FIG. 2 illustrates an example of a simplified flow diagram for an implementation of adding directives for versions of JavaScript files directly into source code.

FIG. 2 illustrates an example of a simplified flow diagram for an implementation of adding directives for versions of JavaScript files directly into source code. The associated metadata may have been identified during preprocessing, as described with FIG. 1 by receiving a JavaScript source file for preprocessing (100), parsing the JavaScript file (102), identifying directive information for a directive within the JavaScript file (104), and associating metadata with the version of the JavaScript file (108). The associated metadata may be stored in memory or any other collection of data for later use.

Metadata associated with a preprocessed directive may be retrieved (200). The preprocessed directive may be a directive from the original JavaScript source code file. The metadata may be associated with the version of the JavaScript source file, associated with the particular preprocessed directive from the original JavaScript source code, associated with a group of one or more JavaScript files, the contextual mode, and/or any other association that can be communicated with the JavaScript file and/or directive or any combination thereof.

In an embodiment, a data structure may be used to allow for retrieval of the metadata. For example, the associated metadata may have been stored in a properties file as name/value pairs. A Java class may be instantiated and the attributes may be assigned the metadata values in properties file. In an embodiment, the name/value pairs may be retrieved with an implementation of a data structure that utilizes a hash function, such as a hash table or hash map, and stored in memory.

In a preferred embodiment, the web server may provide access to a mapping of the associations of metadata established during preprocessing. For example, upon startup of the web server, the Java Map class may be created using the properties file with the associated metadata and a static reference to the Java Map class may be provided. A static reference may exist throughout the execution of a software program and the existence of the static may not depend on the instantiation of a particular class. In another example, the web server may instantiate a Java Map class to hold the associations of metadata. The associations may be placed in to memory with the instantiation of the Java Map class while the web server is executing and the metadata may be retrieved upon request. The mapping may be available in memory at the web server to allow for access of the associated metadata for the preprocessed directive.

A request may be received for associated metadata (202). A request for the associated metadata may be made with a method or function call, use of a script, a Servlet, JSP, and/or any other method for accessing the metadata using webpages. The metadata associated with a preprocessed directive and/or a preprocessed JavaScript file may be requested. For example, metadata associated with the version of the JavaScript source file may be requested, such as a uniform resource locator (URL) or a timestamp. A method or function may be called to retrieve metadata. For example, a method may be called to retrieve a URL for a portion of the JavaScript included in a version of a JavaScript file to ensure that the most recent version of the portion of JavaScript is received.

The method may be called when a user requests a page that utilizes the metadata to create and serve the webpage to the user. In an embodiment, one or more static methods may be available to access the associated metadata. A static method may exist throughout the execution of a software program and the existence of the static may not depend on the instantiation of a particular class.

In an embodiment, a Servlet may be put in the header of the webpage and the Servlet may send requests to receive the metadata associated with the preprocessed directive. In another example, a script may be placed on a webpage with a "script" tag that calls methods to request metadata associated with a preprocessed directive. The mapping may be available in memory at the web server to allow for access of the associated metadata for the preprocessed directive with the requests. For example, the file path for the most recent versions of the JavaScript files may be accessed for each group of JavaScript files associated with and created for a particular version of a JavaScript file during preprocessing.

In another example, localization information may be requested. For example, the language for a button provided by a directive in the original JavaScript may be requested and metadata associated with the preprocessed directive may be requested. The localization information may be requested using a call to a Servlet in the header of the HTML. For example, the header of the HTML may be as follows:

```
<head>
<script src=/jslabels/foo.js />
</head>
``` and the //#label {section: "buttons", param: "go"} in a version of the original JavaScript file may be replaced with the appropriate button with the appropriate text for the nation or culture of the user and/or specified by the user.

At least a portion of markup language for a web page may be generated in accordance with metadata (204). For example, a URL for a particular mode with the most up-to-date version may be placed within the HTML for a webpage in accordance with the metadata. In another example, the appropriate button type may be presented on the webpage in accordance with localization information for the user.

The directives may be used to personalize a webpage for a particular tenant with the associated metadata. In another embodiment, a parameter for a configurable directive may be a tenant identifier from a multi-tenant database. The metadata associated with file and the tenant identifier may be retrieved from a database and/or a file system. In an embodiment, the metadata may be JavaScript, a portion of a webpage, scripts, or tasks that may be personalized for the tenant. Although personalization is provided by way of example on the tenant level, those with skill in the art will recognize that any level of granularity may be used to personalize a webpage (e.g. by user, group of users, etc.).

Figure 3:
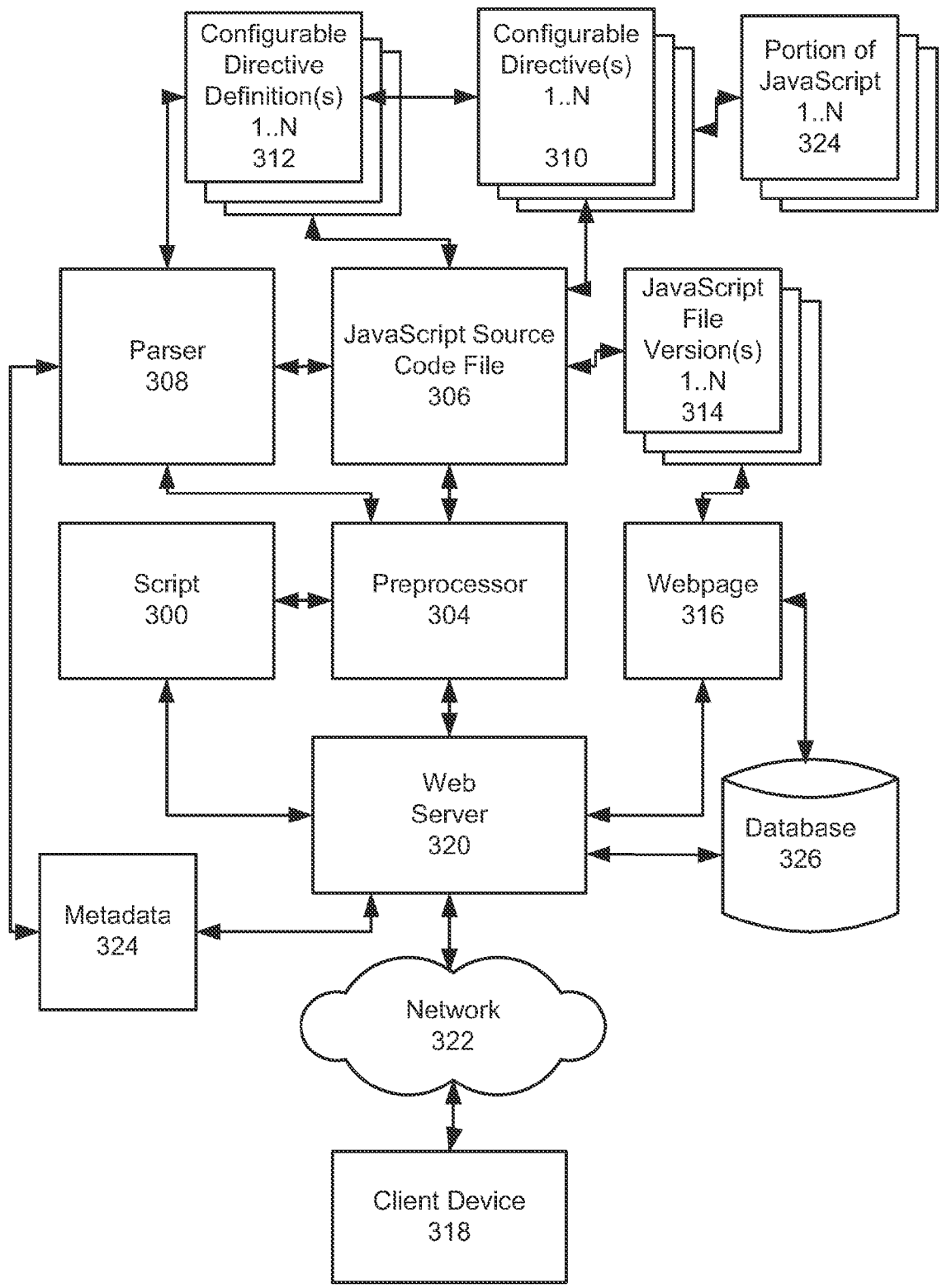
FIG. 3 illustrates an example of a block diagram for an implementation of adding directives for versions of JavaScript files directly into source code.

FIG. 3 illustrates an example of a block diagram for an implementation of adding directives for versions of JavaScript files directly into source code. A Script 300 may be used to indicate the JavaScript Source File 302 to be preprocessed by the Preprocessor 304. In a preferred embodiment, a Java class may be used to run the preprocessing and indicate the JavaScript source file(s) for pre-processing. The Preprocessor 304 may use a Parser 308 to identify Configurable Directives 1 . . . N 310 within the JavaScript Source File 302.

The Configurable Directive 310 may be recognized by the Parser 308 in accordance with the Configurable Directive Definition 1 . . . N 312. The Configurable Directive Definition 1 . . . N may indicate the syntax and semantics of a directive in a JavaScript Source File 302. For example, the Configurable Directive Definition 1 . . . N 312 may indicate what tokens (e.g. words and/or expressions) to be found by the lexer of the Parser 308 and the grouping of tokens to be recognized in the grammar of the Parser 308 for the directive. The Preprocessor 304 may create one or more versions of JavaScript File(s) 314 in accordance with Configurable Directives 310 in the JavaScript Source File 302.

The Configurable Directive 310 may indicate a Mode and one or more Portion(s) of JavaScript 324 to be added to the version of the JavaScript Source Code File 306. A different JavaScript File 314 may be created for each mode found in the Configurable Directives 310 of the JavaScript Source File 302. The JavaScript File(s) 1 . . . N 314 may be used on Webpages 316 served to the Client Device 318 using the Web Server 320 over the Network 322. The JavaScript may be compiled at the browser on the Client Device 318 and used to display the Webpage 316 on the Client Device 318.

In an embodiment, the Web Server 320 may run a script to have Metadata 324 identified during the preprocessing to be available in memory. The Metadata 324 may be identified when parsing the JavaScript Source Code File 306 with the Parser 308. For example, a mapping of URLs to JavaScript for a particular group of JavaScript files created and identified during preprocessing may be placed into memory to handle requests for the URL to reach the particular group of JavaScript files. In another example, a mapping of text written in each language may be mapped to an enumerated type for the language and/or country identified during preprocessing may be placed into memory to handle requests for the appropriate text for a button on a webpage.

In one or more embodiment, a Database 326 may be used to store Metadata 324. A database may be any collection of data including, but not limited to, a relational database, an object-oriented database, a multi-tenant database, a file system, or any other collection of data. In an embodiment, metadata for a tenant, such as JavaScript and/or HTML for a tenant may be stored in the Database 326, and may be retrieved as Metadata 324 associated with the JavaScript Source Code File 306 and a tenant identifier. A tenant identifier may be a primary key that allows for retrieval of the Metadata 324 for a particular tenant.

Figure 4:
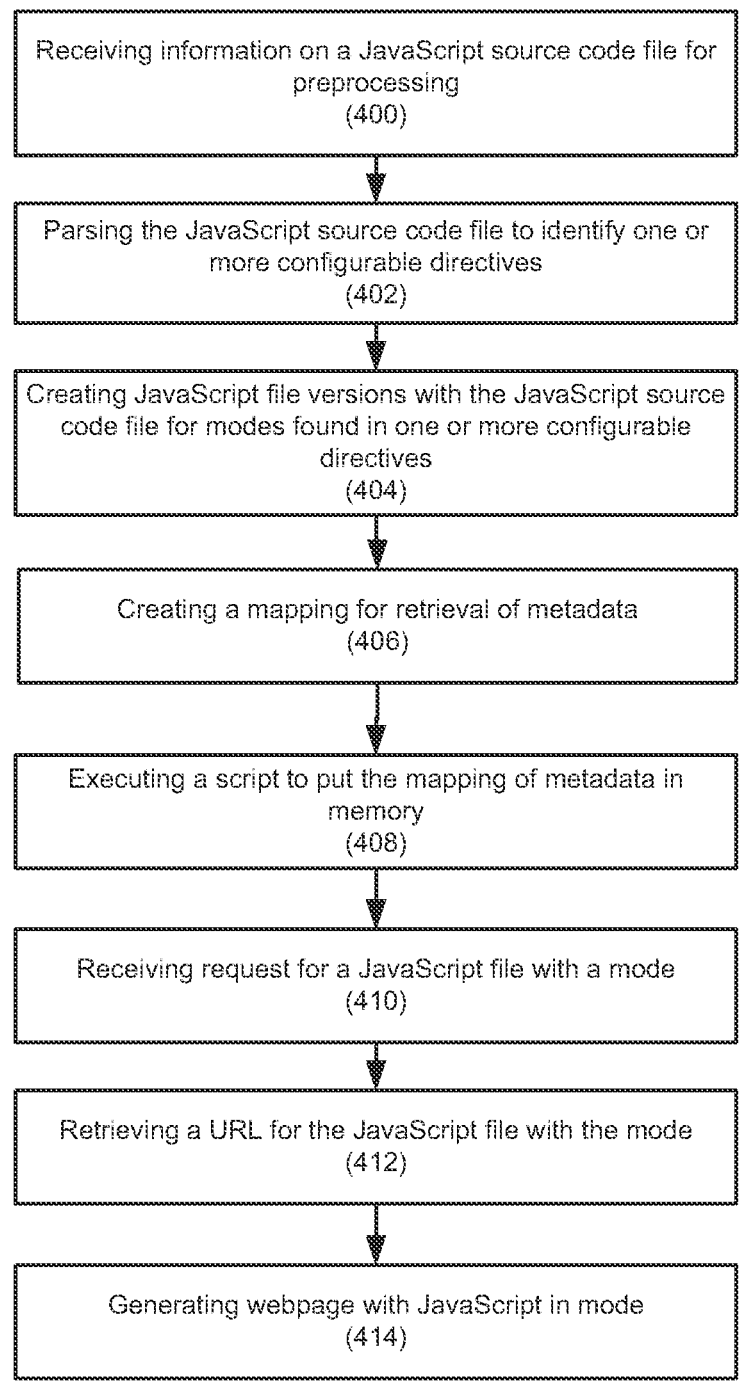
FIG. 4 illustrates an example of a flow diagram for an implementation of adding directives for versions of JavaScript files directly into source code.

FIG. 4 illustrates an example of a flow diagram for an implementation of adding directives for versions of JavaScript files directly into source code. Information may be received on a JavaScript source code file for preprocessing (400). The Script 300 may be used to begin preprocessing of JavaScript files. In an embodiment, the Script 300 is a Java program that begins preprocessing and may indicate the JavaScript Source Code 306 file for preprocessing. The Script 300 may provide a relative file path or file path for the JavaScript source code file to the Preprocessor 304.

The JavaScript source code file may be parsed to identify one or more configurable directives (402). The configurable directive may indicate one or more JavaScript files or portions of JavaScript code that may be written to a version of the JavaScript files produced by the JavaScript Source Code 306 and the Preprocessor 304. The configurable directive in the JavaScript Source Code 306 file may have been configured by a user to have name/value pairs. For example, name/value pairs may be indicated in the text of the directive:

//#include {Mode: ["TEST"], path: "B.js."}
with the Mode="TEST" and the path="B.js."

The configurable directive in the JavaScript Source Code 306 may indicate a relative file path or a file path to a JavaScript file, a directory, or any other file that may indicate one or more JavaScript files to include in a version of the JavaScript source code file. For example, "path:B.js" may indicate that the file "B.js" in the current directory be included in the version of the JavaScript file. In an embodiment, the configurable directive may be configured to identify a filepath to an XML file with groups of JavaScript files to include in a version of the JavaScript source code file.

The configurable directive may indicate modes and/or conditions that must be met for placement of the JavaScript code in a version of a JavaScript source code file produced with the JavaScript Source Code 306 and the Preprocessor 304. For example, "Mode: TEST" may indicate that the following source code or file may be placed in a version of the JavaScript Source Code 306 file for "TEST." In another example, a condition may need to be met and a BOOLEAN value of either true or false will dictate whether the JavaScript is included in the version of the JavaScript file.

Versions of JavaScript files may be created with the JavaScript source code file for modes found in the one or more configurable directives (404). A version of a JavaScript file may be created for each mode found in the one or more configurable directives in the JavaScript Source Code 306 file. In an embodiment, the versions of JavaScript files may only be updated with the underlying source files included with the configurable directives that have changed or been accessed, such that the timedate stamp for the file has been altered.

The Configurable Directive(s) 310 in the JavaScript Source Code 306 file may indicate metadata to be associated with the version of the JavaScript file generated by the preprocessing and/or the Configurable Directive(s) 310. In an embodiment, the timedate for the version of the JavaScript file generated during preprocessing and the timedate for all files used to create the version of the JavaScript file may be associated with the version of the JavaScript file. In another embodiment, metadata with URLs for the JavaScript files that were used to create a version of the JavaScript file for a mode may be associated with the version of the JavaScript File. In another embodiment, localization information for a portion of JavaScript may be associated with the preprocessed directive in the original JavaScript source code file.

A mapping may be created for retrieval of the metadata (406). The metadata may be identified and/or generated during preprocessing. For example, the mapping may include the latest modification timestamp associated with each portion of JavaScript 324 used to create a version of a JavaScript File 314 for the JavaScript Source Code File 306. The mapping may include the configured name/value pairs identified in the Configurable Directive 310. The mapping may include localization information for a portion of the Webpage 316 generated with the JavaScript.

The metadata may be associated with the Configurable Directive 310, the version of the JavaScript File 314, a portion of JavaScript 324 used to create the JavaScript File 314, the original JavaScript Source Code File 306, or any other association that aids in retrieval of the metadata used to create WebPages 316 on the Client Device 318.

A script may be executed to put the metadata mapping in memory (408). In an embodiment, the script is run by the Web Server 320 to ensure that the mapping is in memory for retrieval of the metadata when the WebPages 316 is served to the Client Device 318. For example, the script may instantiate Java classes to ensure that the mapping is in memory and can receive requests for the metadata.

A request may be received for a JavaScript file with a Mode (410). In an embodiment, static methods are provided for retrieval of the correct JavaScript file name for a particular mode. In a preferred embodiment, a Singleton design pattern is used for the methods used to retrieve the metadata (e.g. the URL for a JavaScript file with a particular Mode) to ensure that there is a single mapping of the metadata and that there is a single point of access to the mapping. An example of a request made for a JavaScript file with a particular Mode in a JavaServer Page (JSP) page is, follows:

<% JavaScriptURLs.getURL("B", Mode.PROD) %>.

Continuing with the example, the method "getURL" of the "JavaScriptURL" class may retrieve the file path for the file having the JavaScript for "B" and the mode "PROD" indicated with the enumerated type "Mode.PROD." "B" in the example may be a JavaScript Source Code File name or a Group name included in a JavaScript Source Code File. The metadata of the URL for B may be associated with the JavaScript Source Code File Name and/or the Group indicated in the JavaScript Source Code File Name.

The URL may be retrieved for the JavaScript File with the mode (412). Continuing with the example above, the URL returned may be as follows "/js/[timestamp]/B.js", where "timestamp" is the most recent timestamp when the JavaScript file was altered, accessed, or touched.

The Webpage may be generated for display to the user using the JavaScript with the Mode (414). The retrieved URL may be place in the header of the html file generated and served to the client. For example, the URL retrieved may be placed in the header as follows:

<head> <script src="/js/1234/B.js"/> </head>.

In an embodiment, a webpage may be designated as a webpage never to cache and/or to rarely cache. When a call is made to retrieve a URL (e.g. getURL), a new modification date may be indicated and the function may return the new file name with the new modified name. For example, the modification indicator in the present example could have incremented from "1233" to "1234" in the present example. In another example, a refresh may be requested within the HTML or performed manually with the web browser, and a modified file with a new filename may be retrieved.

Groups

In one or more embodiments, any number of JavaScript file(s) may be assigned to a group. Metadata may be retrieved from a source file and may be used to keep track of dependencies and/or ordering of files to ensure groups are served in the proper order and invalidate groups when the group or portion of the group is updated.

In one or more embodiments, a JavaScript library may be created that may not automatically include every file at once. One or more JavaScript files may be joined into a single file and the single file may be served up dynamically through the use of a Servlet. The inventors note performance issues at both the server side and client side that may occur with an approach that indiscriminately adds new files to a single JavaScript file and includes the single concatenated JavaScript file throughout (e.g. served with every page on a website).

In one or more embodiments, a library of JavaScript files may be split up into groups. The groups may provide the ability to serve multiple JavaScript files with nice code separation and still serve the files up in a group as one file to minimize server roundtrips. In an embodiment, a main group with a majority of the JavaScript may be included on every page.

Groups of JavaScript files may be generated into a static file. A JavaScript library may handle labels and interdependencies and the generated files may be compressed in production mode to reduce their size. For example, to add a new JavaScript file, a determination may be made as to where the file is used. If the file is used only on one or two pages for one or two features, then the file can be placed in a new group and the group may be included on that particular webpage.

Embodiments may utilize Extensible Markup Language (XML) to define and add a new group. For example, an xml file may be used to add a new group (or use the appropriate group). Individual files or entire directories may be specified to be a part of your group. For example, a group may be specified in an xml, as follows:

```
<group name="Reports">
  <file path="common/reporting/Reports.js"/>
</group>
<group name="Calendar">
  <dir path="core/calendar"/>
</group>
```

Continuing with the example, the group may be included on a page. In an embodiment, JavaScript groups may automatically refresh in developer mode such that if you change a file and then refresh the page, then the JavaScript will be updated as well. For example, if a new file or change to the XML file is made, then a user may run an Ant™ task to generate the JavaScript and restart the web server and/or use the "Refresh JS" button in the development header.

In another embodiment, an addition of a file to a JavaScript library directory may not result in the file being pulled in automatically to every page. In one or more embodiments, a new file may be added to a JavaScript library with the creation of a JavaScript group or the addition of the file to an existing group. For example, if you have a JavaScript group by the name of MyGroup, then you can use the "includeScript" tag from the Salesforce Visualforce™ markup in your page as follows:

<apex:includeScript value="/jslibrary/MyGroup"/>.

Thus, in accordance with one implementation of the disclosed embodiments, mechanisms and methods are provided for adding directives for versions of JavaScript files directly into source code. In a method, system, and computer-readable medium having instructions for adding directives for versions of JavaScript files directly into source code, a source file for preprocessing is received and the source file is written in a client-side scripting language, the source file is parsed, directive information is identified for a directive within the source file and the directive information comprises data on at least a portion of a client-side scripting language file and a mode, a version of the source file for the mode is created and the version of the source file comprises source code from the source file and the at least a portion of the client-side scripting language file, and metadata is associated with the directive and the version of the source file.

System Overview

Figure 5:
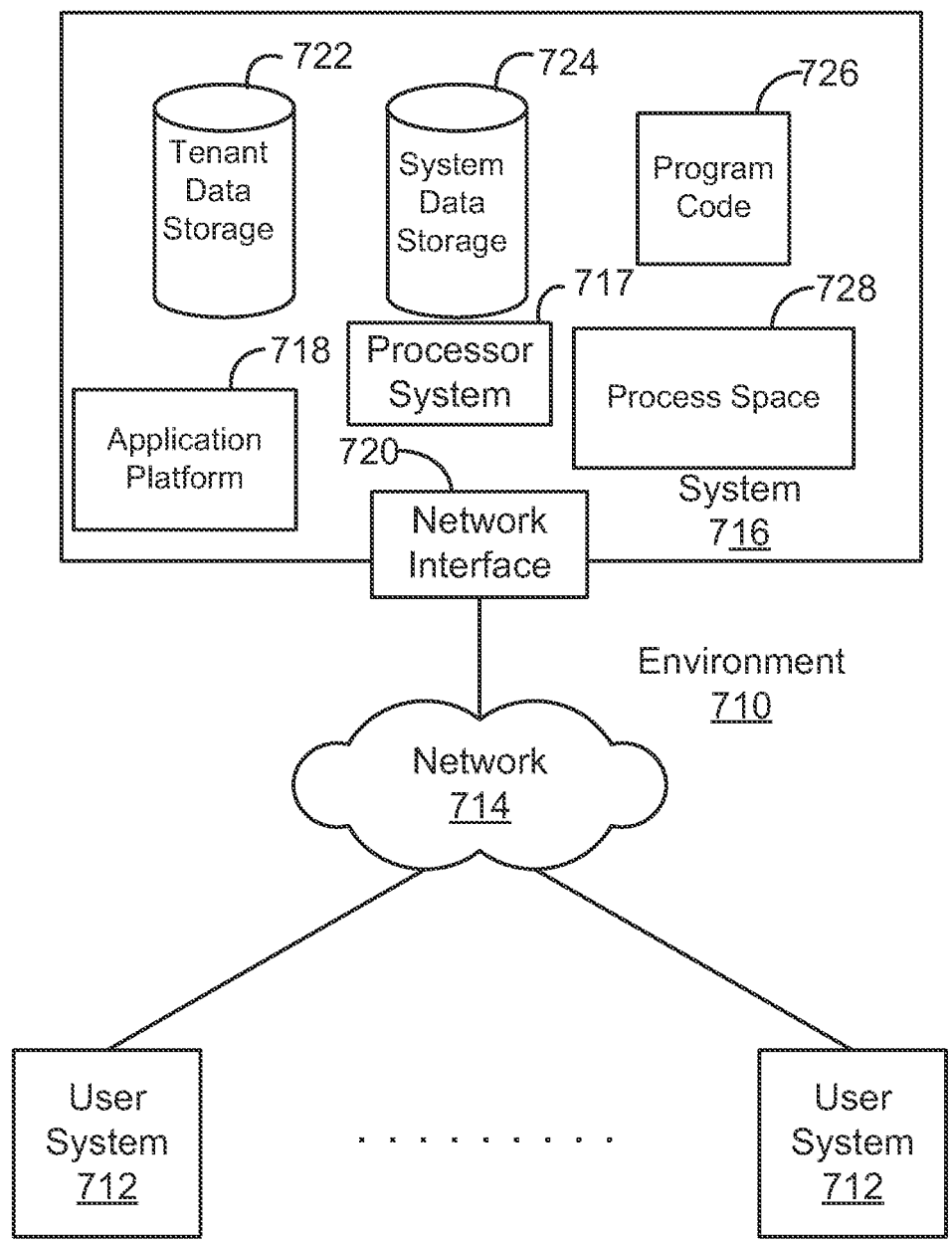
FIG. 5 illustrates a block diagram of an example of an environment wherein an on-demand database service might be used.

FIG. 5 illustrates a block diagram of an environment 710 wherein an on-demand database service might be used. Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 5 (and in more detail in FIG. 6) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" will be used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 5, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 5, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 5 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, Flex, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

While one or more implementations and techniques are described with reference to an embodiment in which adding directives for versions of JavaScript files directly into source code is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Figure 6:
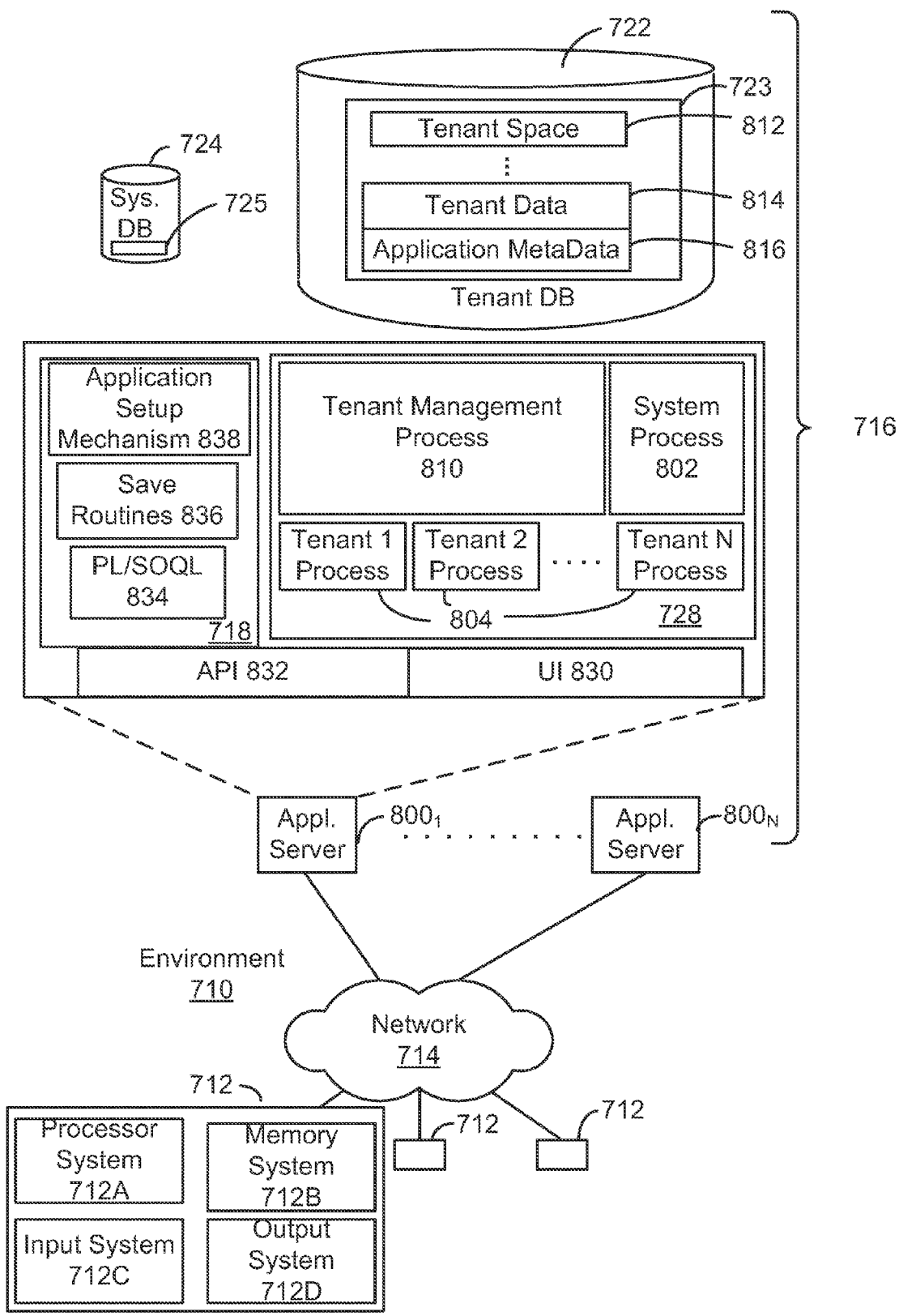
FIG. 6 illustrates a block diagram of an embodiment of elements of FIG. 5 and various possible interconnections between these elements.

FIG. 6 also illustrates environment 710. However, in FIG. 6 elements of system 716 and various interconnections in an embodiment are further illustrated. FIG. 6 shows that user system 712 may include processor system 712A, memory system 712B, input system 712C, and output system 712D. FIG. 6 shows network 714 and system 716. FIG. 6 also shows that system 716 may include tenant data storage 722, tenant data 723, system data storage 724, system data 725, User Interface (UI) 830, Application Program Interface (API) 832, PL/SOQL 834, save routines 836, application setup mechanism 838, applications servers 8001-800N, system process space 802, tenant process spaces 804, tenant management process space 810, tenant storage area 812, user storage 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 5. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks.

Output system 712D may be any combination of output devices, such as one or more monitors, printers, and/or interfaces to networks. As shown by FIG. 6, system 716 may include a network interface 720 (of FIG. 5) implemented as a set of HTTP application servers 800, an application platform 718, tenant data storage 722, and system data storage 724. Also shown is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712. The tenant data 723 might be divided into individual tenant storage areas 812, which can be either a physical arrangement and/or a logical arrangement of data. Within each tenant storage area 812, user storage 814 and application metadata 816 might be similarly allocated for each user. For example, a copy of a user's most recently used (MRU) items might be stored to user storage 814. Similarly, a copy of MRU items for an entire organization that is a tenant might be stored to tenant storage area 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832. Invocations to applications may be detected by one or more system processes, which manages retrieving application metadata 816 for the subscriber making the invocation and executing the metadata as an application in a virtual machine.

Each application server 800 may be communicably coupled to database systems, e.g., having access to system data 725 and tenant data 723, via a different network connection. For example, one application server 8001 might be coupled via the network 714 (e.g., the Internet), another application server 800N-1 might be coupled via a direct network link, and another application server 800N might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 700 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

I claim:

1. A method, comprising:
    creating a version of a source file that comprises: source code from the source file and at least a portion of a client-side scripting language file for generating at least a portion of markup language for a web page to be served to a client device using a webserver;
    associating, at a processor, metadata with a preprocessed directive and a version of the source file, wherein the metadata comprises: at least the portion of the client-side scripting language file;
    retrieving, via the webserver from a database, only the metadata associated with the preprocessed directive in the version of the source file such that the entire source file does not need to be retrieved; and
    in response to receiving a request for the metadata associated with the version of the source file, generating, in accordance with the metadata associated with the preprocessed directive and the version of the source file, at least the portion of the markup language for the web page to be served to the client device.

2. The method of claim 1, further comprising:
    at the processor:
        receiving the source file for preprocessing, wherein the source file comprises source code and is written in the client-side scripting language;
        parsing the source file and identifying directive information for the preprocessed directive within the source code of the source file, wherein the directive information comprises: data on the at least the portion of the client-side scripting language file and a mode; and
    wherein the step of creating comprises:
        creating the version of the source file for the mode that comprises: the source code from the source file and the at least the portion of the client-side scripting language file.

3. The method of claim 2, wherein the mode is debug mode.

4. The method of claim 2, wherein the mode is development mode.

5. The method of claim 2, wherein the mode is production mode.

6. The method of claim 2, wherein the mode is test mode.

7. The method of claim 2, wherein the mode is performance test mode.

8. The method of claim 1, wherein retrieving comprises:
    retrieving, at the webserver from the database, only the metadata associated with the preprocessed directive from the source code from the source file that is also included in the version of the source file such that an entire source file does not need to be retrieved.

9. The method of claim 1, wherein the metadata further comprises: information regarding which portions of the source file have been altered since a last preprocessing of the source file has occurred.

10. The method of claim 1, wherein the data on at least a portion of the client-side scripting language file comprises a file path for a directory.

11. The method of claim 1, wherein the version of the source file comprises JavaScript for one or more groups, and wherein the metadata for the version of the source file comprises a URL for a group from the one or more groups.

12. The method of claim 1, wherein the directive comprises at least one of:
    an include directive; and
    an if directive.

13. A non-transitory computer-readable storage medium having one or more instructions thereon for adding directives for versions of JavaScript files directly into source code, the instructions when executed by one or more processors causing the one or more processors to carry out:
    creating, at one of the processors, a version of a source file that comprises: source code from the source file and at least a portion of a client-side scripting language file for generating at least a portion of markup language for a web page to be served to a client device using a webserver;
    associating, at one of the processors, metadata with a preprocessed directive and a version of the source file, wherein the metadata comprises: at least a portion of the client-side scripting language file;
    retrieving, via one of the processors that is implemented at the webserver from a database, only the metadata associated with the preprocessed directive in the version of the source file such that the entire source file does not need to be retrieved; and
    in response to receiving a request for the metadata associated with the version of the source file, generating, at one of the processors in accordance with the metadata associated with the preprocessed directive and the version of the source file, at least the portion of the markup language for the web page to be served to the client device.

14. The non-transitory computer-readable storage medium of claim 13, wherein the instructions when executed by the one or more processors further cause the one or more processors to carry out:
    receiving, at one of the processors, the source file for preprocessing, wherein the source file comprises source code and is written in the client-side scripting language;
    parsing, at one of the processors, the source file and identifying directive information for the preprocessed directive within the source code of the source file, wherein the directive information comprises: data on at least the portion of the client-side scripting language file and a mode; and
    wherein the step of creating comprises:

creating the version of the source file for the mode that comprises: the source code from the source file and the at least the portion of the client-side scripting language file.

15. The non-transitory computer-readable storage medium of claim 13, wherein retrieving comprises:
retrieving, via one of the processors that is implemented at the webserver from the database, only the metadata associated with the preprocessed directive from the source code from the source file that is also included in the version of the source file such that an entire source file does not need to be retrieved.

16. The non-transitory computer-readable storage medium of claim 13, wherein the mode comprises at least one of debug, development, production, test, and performance test.

17. The non-transitory computer-readable storage medium of claim 13, wherein the data on at least a portion of the client-side scripting language file comprises a file path for a directory.

18. The non-transitory computer-readable storage medium of claim 13, wherein the version of the source file comprises JavaScript for one or more groups, and wherein the metadata for the version of the source file comprises a URL for a group from the one or more groups.

19. The non-transitory computer-readable storage medium of claim 13, wherein the metadata further comprises: information regarding which portions of the source file have been altered since a last preprocessing of the source file has occurred.

20. A system for adding directives for versions of JavaScript files directly into source code, the system comprising:
a first processor;
a web server;
a database; and
one or more stored sequences of instructions which, when executed by the first processor, cause the first processor to carry out:
create a version of a source file that comprises: source code from the source file and at least a portion of a client-side scripting language file for generating at least a portion of markup language for a web page to be served to a client device using the web server;
associate metadata with a preprocessed directive and a version of the source file, wherein the metadata comprises: at least the portion of the client-side scripting language file;
wherein the web server is configured to:
retrieve, from the database, only the metadata associated with the preprocessed directive in the version of the source file such that the entire source file does not need to be retrieved; and
in response to receiving a request for the metadata associated with the version of the source file, generate, in accordance with the metadata associated with the preprocessed directive and the version of the source file, at least the portion of the markup language for the web page to be served to the client device.

* * * * *